July 24, 1951 W. G. CHESTER 2,561,340

MODEL ACTIVATOR

Filed Sept. 17, 1945 2 Sheets-Sheet 1

INVENTOR
WILLIAM G. CHESTER

BY Ralph L. Chappell

ATTORNEY

July 24, 1951 W. G. CHESTER 2,561,340

MODEL ACTIVATOR

Filed Sept. 17, 1945 2 Sheets-Sheet 2

INVENTOR
WILLIAM G. CHESTER

BY Ralph L. Chappell
ATTORNEY

Patented July 24, 1951 2,561,340

UNITED STATES PATENT OFFICE 2,561,340

MODEL ACTIVATOR

William G. Chester, Yonkers, N. Y.

Application September 17, 1945, Serial No. 616,935

14 Claims. (Cl. 35—1)

(Granted under the act of March 3, 1883, as amended April 30, 1928; 370 O. G. 757)

This invention relates to training devices and is illustrated as embodied in a device for activating models used in shadowgraph recognition training for aircraft personnel.

This invention has been developed with particular regard to training in night recognition but many of its features are suitable for other types of recognition training particularly day recognition and for other purposes.

The shadowgraph is a convenient means for demonstrating silhouettes of models and is particularly well adapted for night training. It includes a translucent screen upon which a light is projected. A model of the object to be identified is placed between the light and the screen. Thus, a shadow silhouette of the model is produced on the screen. The brightness of the screen in the areas thereof surrounding the shadow silhouette is varied by changing the brightness of the source of the light projected on the screen. Night conditions are simulated by the use of relatively low levels of illumination.

The principles involved in night recognition are different from those in day recognition and require a different approach. The typical day recognition training includes "flashing" a picture or a silhouette of the object to be identified on a screen before a class for a brief moment following which the members of the class try to identify it. This method is unsatisfactory for night training because of the manner in which the eye visualizes objects at low levels of illumination.

The mechanism by which the eye sees objects at night is not the same as that used for day seeing. The light sensitive nerve endings at the back of the retina are of two kinds, cones and rods. The cones are concentrated in the foveal or bull's eye area. Thus, the image of any object viewed directly by the eye will fall upon the cones, which convey through the nervous system an interpretation to the brain. The cones are blind at illuminations of less than approximately half moon intensity, and below this level of illumination sight is obtained by use of the rods.

The rods are in the area outside the fovea and they also transmit interpretations of objects seen to the brain. However, since they are in the peripheral area of the retina, it is not possible to convey an image to them by looking directly at it. It becomes necessary to look "off center" and the best angle for observation will vary with the individual. This means developing a system of searching. The rods tire quickly and are at their best only for short periods. It is necessary, therefore, to search small areas carefully and systematically, resting the eyes frequently by blinking. Thus, much practice is required to develop a proper system of searching.

The rods pick up moving objects more easily than stationary ones. Moreover, the locating of moving objects requires constant scanning and moving objects are what must be identified in actual night flying. Therefore, a still picture is not satisfactory for night recognition training.

The value of the shadowgraph for the presentation of plane and ship silhouettes is generally recognized by those in charge of recognition training. For night recognition, a silhouette is more suitable for training purposes than a picture showing all features because of the elimination of detail in night views. The shadowgraph conveniently produces a moving silhouette of a plane or ship which is eminently satisfactory for identification purposes.

The conventional method of showing a plane model on the shadowgraph has been to place it on a wire wand and move it by hand behind the screen in such a manner as to present all attitudes of the plane in actual flight. The disadvantages of this method are manifest particularly for night recognition wherein the operator must work in the dark. It is difficult simultaneously to maneuver the model properly, adjust the light, and watch the screen to be sure the class can see. Moreover, the operator's hand may show on the screen and be confused with the plane at low levels of illumination. Furthermore, it is difficult to maintain uniformity of attitude and properly to simulate plane movements by hand.

Therefore, it is a principal object of this invention to provide an identification training device which accurately simulates actual night flying identification problems.

It is a further object of this invention to provide a training device in which the objects to be identified move before the observer in a realistic manner.

It is a further object of this invention to provide an activator for use with a shadowgraph which automatically moves models in such a way that various attitudes thereof are shown in proper sequence on the shadowgraph screen.

Accordingly, this invention provides, in conjunction with a shadowgraph screen and a source of light, a model activator which includes a staff adapted to hold a model, a rotatable member to which the staff is attached, and means for rotating the member to cause realistic shadow silhouettes of the model in various attitudes to be projected on the screen.

A feature of this invention is the use of a turntable to carry ship models and to activate the shaft upon which plane models are mounted. A track associated with the turntable guides the shaft and causes models to move in such a manner that the shadow silhouettes perform realistic maneuvers.

With the above and other objects and features in view, the invention will now be described with reference to the accompanying drawings which illustrate a preferred embodiment of the invention and will be pointed out in the claims.

Figure 1:
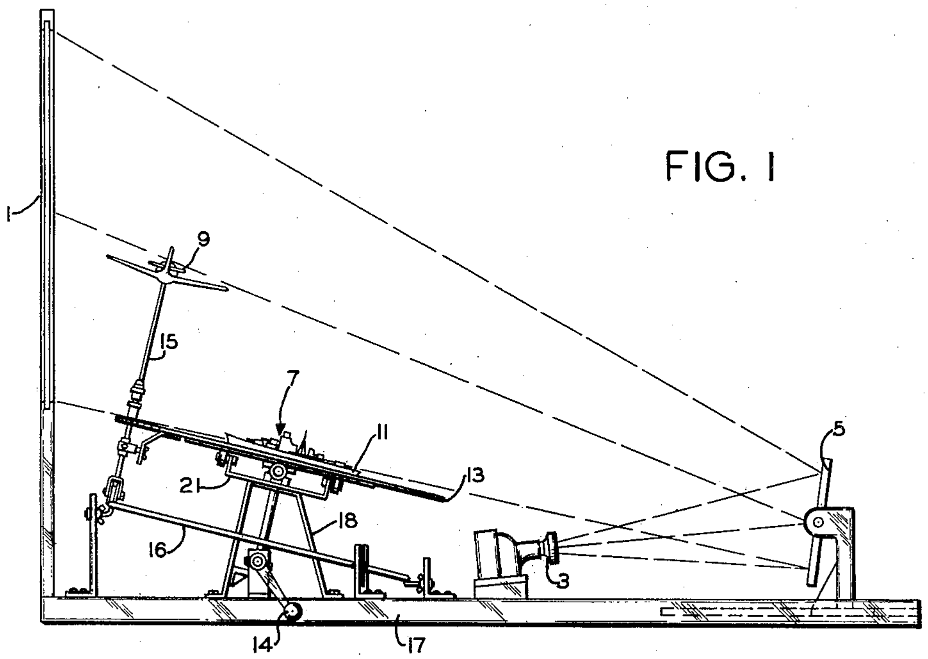
Fig. 1 is a general side elevational view showing a shadowgraph with an activator constructed in accordance with this invention having a model plane and a model ship mounted thereon.

As illustrated in Fig. 1 the device includes a screen 1 upon which light is projected by a projector 3. Light from the projector is reflected on the screen 1 by a mirror 5. Between the mirror and the screen is placed an activator 7 upon which may be mounted a model plane 9 and a model ship 11. If desired, several models can be mounted on the activator at one time.

Figure 3:
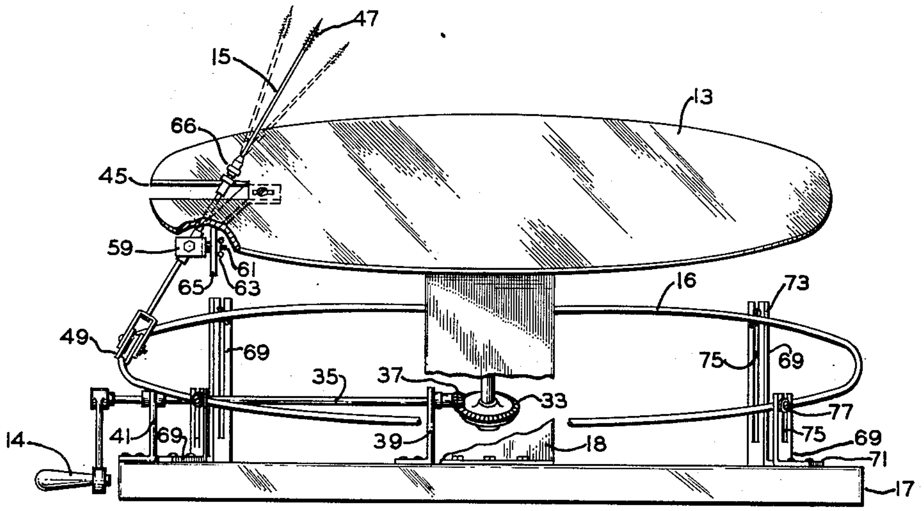
Fig. 3 is an elevational view of the activator, looking in the direction of the screen, part of the track and the turntable support being broken away to show details of the operating mechanism.

As shown in Fig. 3, the activator includes a turntable 13, rotated by turning a crank 14, upon which turntable models of ships are mounted. Attached to the turntable is a staff 15, the lower end of which is supported on a track 16 of specially designed shape. Model planes are mounted at the top of the staff 15 and are made to move when the crank 14 is turned.

The activator is designed so that the models are between the light source and the screen. Thus, a moving shadow image of each model is produced on the screen.

The machine which has, up to this point, been described generally will now be described in greater detail.

The screen 1 (Fig. 1) is made of translucent material and shadows projected upon the right-hand side thereof are transmitted through the screen and can be viewed from the left-hand side. A group to be instructed with the aid of the device watches the screen from the left-hand side thereof. The screen may be made of linen or airplane cloth coated with airplane dope and stretched during drying or may be of any other translucent material suitable for use in a shadowgraph screen. If desired, the screen may be movable either vertically or horizontally to vary the part of the screen through which shadow images move.

Light is projected on the screen 1 by the projector 3 which may be of the type in which slides carrying appropriate photographs and background material may be inserted for projection upon the screen. The projector is equipped with a rheostat (not shown) or other suitable device for varying the intensity of light projected on the screen so that varying conditions of light, e. g., starlight, moonlight, etc. can be simulated. It has been found that the following values of screen brightness give a proper simulation of varying actual night conditions. For starlight 100–200 micro-foot lamberts, for half moonlight 1000–4000, and for full moonlight 5000–20,000. The wide range given for each value is to allow for differences due to seasonal changes in the elevation of the moon and for the variations in the brightness of different parts of the sky.

The mirror 5, which reflects light from the projector 3 into the screen 1, is added to the lighting system in order to make the device compact and in order to keep the projector 3 near the activator 7 to permit one person to operate both.

Figure 4:
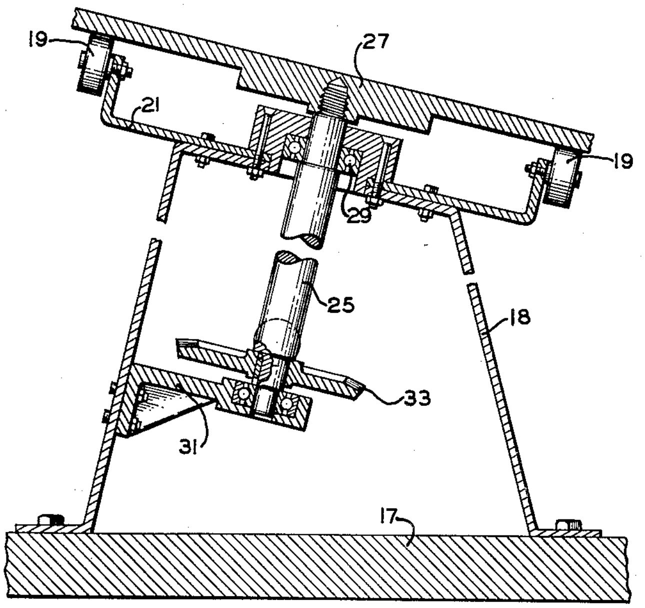
Fig. 4 is an enlarged sectional view showing details of the turntable support.

The general details of the activator 7 can best be seen by reference to Figs. 3 and 4.

Figure 2:
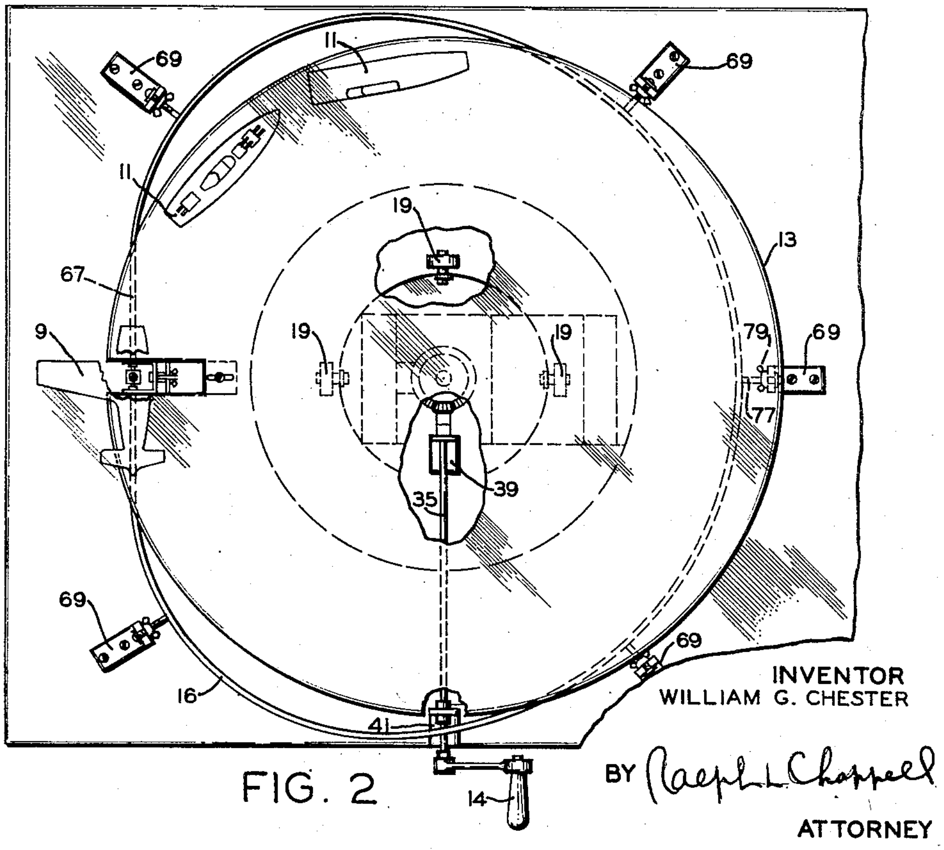
Fig. 2 is a plan view of the activator shown in Fig. 1, partly broken away to show the details of the mechanism for operating the activator.

The activator is mounted on a base 17 which may be a flat horizontal wooden table or other suitable base. A standard 18 is attached to the base and has an inclined bracket 21 on its upper end which carries four wheels 19 (Fig. 4) which in turn support the turntable 13 upon which ship models are mounted as shown in Fig. 2. The turntable is mounted (Fig. 1) in such a manner that the edge of the turntable nearest the screen is just flush with the path of the ray of light which hits the bottom of the screen while the opposite edge of the turntable is somewhat lower than the path of this ray. Thus, when the turntable revolves, the ship models appear in full silhouette when nearest the screen and, when away from the screen, give a realistic simulation on the screen of being "hull down."

The apparatus for rotating the turntable 13 is shown in Figs. 3 and 4. One end of a drive shaft 25 is threaded into a reinforced central section 27 of the turntable 13. A bearing 29 (Fig. 4), which may be a ball or roller bearing, supports the drive shaft 25 on the bracket 21 and standard 18. The lower end of the drive shaft 25 is supported by a brace 31 attached to the standard 18 and carries a gear 33 by means of which the drive shaft 25 and the turntable 13 are driven.

The activator is operated by turning the crank 14 (Fig. 3) which is connected to the gear 33 by a shaft 35 and a pinion 37 at the end thereof. A pair of supports 39 and 41 attached to the base 17 carry the crank 14 and the shaft 35. If remote control is desired, a small electric motor and associated reduction gears can be substituted for the crank 14.

The staff 15 (Figs. 1 and 5) upon which the plane model 9 is mounted extends upwardly through a slot 45 (Fig. 3) in the turntable 13. The top part of the staff is equipped with a wood screw tip 47 upon which plane models are attached. A wheel 49 is attached to the lower end of the staff and rides upon the track 16, which will be described in greater detail below and serves to guide the model plane causing it to turn as the turntable rotates in order to give the proper illusion of a plane moving forward continuously.

Figure 5:
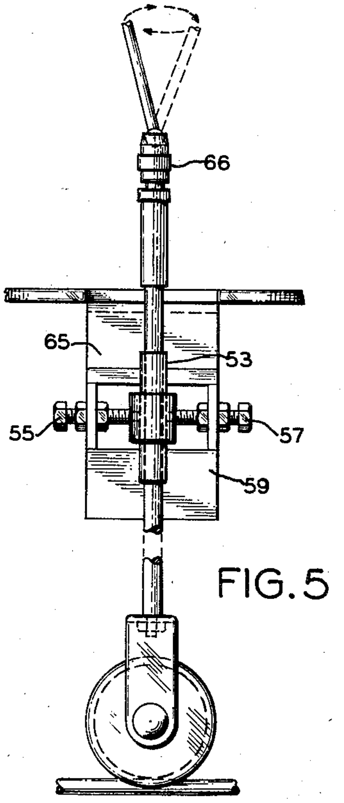
Fig. 5 is an enlarged detailed view of the model plane mount.

Details of the manner in which the staff is attached to the turntable are clearly shown in Fig. 5. A sleeve 53 fits snugly around and slidably receives the staff. The sleeve 53 is rotatably mounted for swinging movement in a vertical plane upon a pair of bolts 55 and 57 which in turn are mounted in a housing 59 (Fig. 3). The housing 59 is attached by means of a bolt 61 and a wing nut 63 to a bracket 65 attached to the lower side of the turntable 13. The entire staff assembly including the staff, wheel, sleeve, and housing can be demounted from the activator by loosening the wing nut 63. A universal joint 66 located in the staff just above the housing permits the staff to be inclined to adjust the model plane with respect to the turntable 13 and vary the attitude of the plane model's shadow silhouette. The activator is illustrated with one staff and plane model installed. However, if desired, two or more staffs can be attached to the turntable.

A preferred design for the track 16 is shown in Fig. 2. The track as shown includes a straight section 67 near the screen, the rest of the track being curved. It has been found that by use of a track substantially as shown, a shadowgraph image is produced which closely simulates the maneuvering encountered in actual flying. However, this invention is not to be considered as limited to the use of a track of this particular design for tracks of other shapes, e. g., circular and elliptical shaped tracks can be used with success.

The track 16 is held in place as shown in Figs. 2 and 3 by a series of L-shaped supports 69 which are attached to the base 17 and carry the track 16 and which are of different height so that the track can be, if desired, supported in inclined position. One arm 71 of each of the supports is attached to the base 17. The other arm 73 of each support is equipped with a vertical slot 75 (Fig. 3) through which pass bolts 77 which are attached to the lower side of the track 16. Wing nuts 79 (Fig. 2) mounted on the bolts 77 hold the track 16 in place in relation to the supports 69. The track can be raised or lowered and the angle at which the track is inclined from the horizontal can be changed by moving it up or down in the supports 69.

When the activator is to be used, the members of a group to be instructed with its aid are located on the side of the screen 1 away from the activator (left of the screen in Fig. 1). For night recognition training the distance of each member of the group from the screen should be carefully determined to scale with the models for the distance at which a small image can be identified is limited, particularly at low levels of illumination.

Before the activator is put in use to simulate night flying conditions, time must be given for eyes to become adapted to the dark. This can be done by having the members of the group wear red glasses 20 minutes before a session begins or watch an appropriate motion picture presented with red filter used before the projector.

When sufficient time has elapsed to permit eye accommodation the activator is set in operation. Plane and ship models are mounted as shown at 9 and 11 in Fig. 1. The projector 3 is turned on and the light intensity raised to a proper amount.

The activator is turned with the aid of the crank 14 and shadows are produced on the screen 1 the movements of which closely simulate the movements of actual ships and planes as they turn, bank and otherwise maneuver.

Actual night flying conditions are closely approximated with the aid of this device. Moreover, the combination of the activator with slides inserted in the projector 3 and with motion pictures makes for a system which is flexible enough to retain the interest of students where other methods fail.

The invention described herein may be manufactured and used by or for the Government of the United States of America for Government purposes without the payment of any royalty thereon or therefor.

Having described the invention what is claimed as novel and desired to be protected by Letters Patent of the United States is:

1. In a training device, a screen, a staff having an airplane model mounted on one end thereof, a light source arranged to direct a beam of light towards said model and screen for producing a silhouette of said model on said screen, and means for moving said staff across said beam and simultaneously turning and tilting said staff in different directions to cause said silhouette to represent a banked turn of said model as said silhouette traverses said screen.

2. In a training device, a screen, a support having an airplane model mounted thereon, a light source arranged to direct a beam of light towards said model and screen for producing a silhouette of said model on said screen, and means for rotating the support about one axis to cause said silhouette to represent successively end and side views of said model airplane in a turn, and means for simultaneously rotating said support about another axis extending transversely with respect to the first-mentioned axis to vary the bank of said model during its turn.

3. In a training device, a screen, means for projecting light on said screen, a turntable located between said screen and said projecting means and adapted to carry a model, a staff carried by said turntable and adapted to carry a model, means for rotating said turntable, and means associated with said turntable for swinging said staff relative to the turntable as the turntable is rotated.

4. A device according to claim 3 including means whereby the staff is rotated about its own axis and is swung in a plane at an angle to the turntable during rotation thereof.

5. A device according to claim 3 wherein the turntable is inclined, the staff projects upwardly therefrom and is mounted for swinging movement in a plane perpendicular to the turntable and for rotation about its own axis; and means is provided for rotating the staff and swinging it during rotation of the turntable.

6. A training device comprising a screen, means for projecting a light on said screen, and means for interrupting said light to cast a shadow on said screen, said interrupting means comprising a model, a staff, said model being mounted on one end of said staff, a rotatable member, said staff being mounted to slide and swing with respect to said member, a continuous track associated with said member, and means for causing the other end of said staff to follow said track whereby the shadow moves with respect to said screen when said member is rotated.

7. A training device comprising a screen, means for projecting a light on said screen, and means for interrupting said light to cast a shadow on said screen, said interrupting means comprising a model, a staff, said model being mounted on one end of said staff, a rotatable member, said staff being mounted to slide and swing with respect to said member, a continuous track associated with said member, said track being mounted for adjustment with respect to said member, and means for causing the other end of said staff to follow said track whereby the shadow moves with respect to said screen when said member is rotated.

8. In a training device comprising a vertical screen, means for projecting a light, an adjustable mirror for reflecting said light on said screen, an inclined turntable located between said screen and said mirror, a ship model mounted on said turntable and adapted to interrupt said light to cast a shadow on said screen, and means for rotating said turntable to cause said shadow to move with respect to said screen, said turntable being arranged whereby said shadow simulates at a point in its motion with respect to said screen the appearance of a ship hull-down.

9. In a training device, a screen, a movable support having a ship model mounted thereon, means attached to said support for carrying an airplane model, a light source arranged to direct a beam of light toward said screen and across said ship and airplane models thereby producing silhouettes of said models upon said screen, means for activating said movable support for causing the ship model silhouette to traverse said screen, means including said movable support for causing the airplane model silhouette to execute realistic maneuvers in relation to said ship model silhouette as said ship model silhouette traverses said screen.

10. A training device comprising, a screen, projection means for illuminating said screen, an inclined turntable disposed between said screen and said projection means, a ship model mounted upon said turntable and adapted to cast a shadow upon said screen, means for rotating said turntable to cause said shadow to move across said screen, a staff, said staff being pivotally mounted upon said turntable, an airplane model secured to an end of said staff and adapted to cast a shadow upon said screen above said ship model shadow, a track having a predetermined configuration, the end of said staff opposite said airplane model being adapted to engage said track, said track being arranged to cause said airplane model to execute realistic maneuvers above said ship model upon rotation of said turntable.

11. Apparatus as in claim 10 wherein said staff includes a universal joint arranged to permit adjustment of the orientation of said airplane model.

12. Apparatus as in claim 10 wherein said track is continuous and mounted in adjustable relation with said turntable.

13. In a training device, a screen, a turntable and rotating means therefor, a model mounted upon said turntable, projection means for illuminating said screen, said model and said turntable being disposed between said screen and said projection means thereby casting a shadow upon said screen of both model and turntable, the inclination of said turntable being arranged such that the fractional portion of said model casting a shadow upon said screen in relation to the shadow of said turntable, is altered during rotation of said turntable.

14. In a training device, a screen, a turntable and rotating means therefor, a ship model mounted upon said turntable, projection means for illuminating said screen, said turntable and said ship model being disposed between said projection means and said screen whereby said ship model and turntable cast shadows upon said screen, means for rotating said turntable to cause said shadows to move with respect to said screen, the inclination of said turntable being arranged whereby said ship model shadow appears in full silhouette at one point on said screen and appears hull-down at another point thereon in relation to said turntable shadow.

WILLIAM G. CHESTER.

REFERENCES CITED

The following references are of record in the file of this patent:

UNITED STATES PATENTS

| Number | Name | Date |
|---|---|---|
| 1,038,728 | Cummings | Sept. 17, 1912 |
| 1,478,099 | Bounds | Dec. 18, 1923 |
| 1,489,191 | Chester | Apr. 1, 1924 |
| 1,564,138 | Rowland | Dec. 1, 1925 |
| 1,829,829 | Goodwin | Nov. 3, 1931 |
| 2,016,151 | Levene | Oct. 1, 1935 |
| 2,046,202 | Miles | June 30, 1936 |
| 2,208,083 | Rousseau | July 16, 1940 |
| 2,364,070 | Haile | Dec. 5, 1944 |
| 2,364,720 | Jones | Dec. 12, 1944 |

FOREIGN PATENTS

| Number | Country | Date |
|---|---|---|
| 134,740 | Great Britain | 1919 |